US007624218B2

(12) United States Patent
Juenger

(10) Patent No.: US 7,624,218 B2
(45) Date of Patent: Nov. 24, 2009

(54) SYSTEM AND METHOD FOR DVI NATIVE AND DOCKING SUPPORT

(75) Inventor: Randall E. Juenger, Belton, TX (US)

(73) Assignee: Dell Products L.P., Round Rock, TX (US)

( * ) Notice: Subject to any disclaimer, the term of this patent is extended or adjusted under 35 U.S.C. 154(b) by 1196 days.

(21) Appl. No.: 10/689,253

(22) Filed: Oct. 20, 2003

(65) Prior Publication Data

US 2005/0083247 A1 Apr. 21, 2005

(51) Int. Cl.
*G06F 13/00* (2006.01)

(52) U.S. Cl. .......................... 710/303; 345/3.1; 345/30; 345/502

(58) Field of Classification Search ................. 710/303, 710/305; 345/502, 30, 3.1
See application file for complete search history.

(56) References Cited

U.S. PATENT DOCUMENTS 5,559,525 A * 9/1996 Zenda ........................ 345/3.1
5,935,226 A * 8/1999 Klein ......................... 710/303
6,038,670 A * 3/2000 Oh ............................. 713/300
6,216,185 B1 4/2001 Chu ........................... 710/101
6,243,727 B1 * 6/2001 Watts, Jr. .................... 708/100
6,299,464 B1 * 10/2001 Chen .......................... 439/131
6,311,263 B1 * 10/2001 Barlow et al. ................. 712/36
6,345,330 B2 2/2002 Chu ............................ 710/65
6,606,678 B1 * 8/2003 Nakamura .................. 710/305
6,772,265 B2 * 8/2004 Baweja et al. ............... 710/303
6,784,877 B1 * 8/2004 Kim et al. ................... 345/204
6,804,724 B2 * 10/2004 Shin .............................. 710/2
6,831,621 B2 * 12/2004 Nakano ....................... 345/87
6,864,891 B2 * 3/2005 Myers ........................ 345/502
6,873,306 B2 * 3/2005 Hansen et al. ............... 345/1.2
6,903,706 B1 * 6/2005 Trottier et al. ............... 345/1.1

(Continued)

FOREIGN PATENT DOCUMENTS

KR 1020010011020 A 2/2001

OTHER PUBLICATIONS

Digital Tigers. SideCar PlusTwo Pro. Specification sheet. Sep. 3, 2003.*

(Continued)

*Primary Examiner*—Mark Rinehart
*Assistant Examiner*—Matthew D Spittle
(74) *Attorney, Agent, or Firm*—Hamilton & Terrile, LLP; Robert W. Holland

(57) ABSTRACT

DVI native and docking station support for a portable information handling system provides output of display information from a either DVI connector at the portable information handling system housing or from a DVI connector at the portable information handling system docking station. A DVO signal outputs from a graphics component to a multiplexer that selectively provides the DVO signal to a TMDS transmitter associated with a housing DVI connector or to a TMDS transmitter associated with a docking station to information handling system connector and docking station DVI connector. Selection of the housing TMDS transmitter to receive the DVO signal is made if the information handling system is not coupled to the docking station, and selection of the docking station TMDS transmitter to receive the DVO signal is made if the information handling system is coupled to the docking station at the docking station connector.

22 Claims, 3 Drawing Sheets

U.S. PATENT DOCUMENTS

| | | | | |
|---|---|---|---|---|
| 6,956,542 | B2 * | 10/2005 | Okuley et al. | 345/1.1 |
| 6,964,054 | B1 * | 11/2005 | Laviolette et al. | 719/321 |
| 7,123,212 | B2 * | 10/2006 | Acharya et al. | 345/2.1 |
| 7,176,847 | B2 * | 2/2007 | Loh | 345/2.2 |
| 2002/0003507 | A1 | 1/2002 | Dodge | 345/3.1 |
| 2003/0008566 | A1 | 1/2003 | Kato et al. | 439/638 |
| 2003/0142089 | A1 | 7/2003 | Myers | 345/213 |
| 2003/0210208 | A1 * | 11/2003 | Pu et al. | 345/1.1 |
| 2003/0231191 | A1 * | 12/2003 | Glen | 345/690 |
| 2006/0119603 | A1 * | 6/2006 | Chen et al. | 345/502 |

OTHER PUBLICATIONS

Digital Tigers. SideCar PlusFour Pro. Installation and User Guide rev. 1.2 Nov. 25, 2003.*

Intel. Intel Integrated Graphics Device OpRegion Specification. Driver Programmer's Reference Manual. Revision 1.0. Oct. 1, 2008.*

Belkin. Hi-Speed Laptop Docking Station. Data Sheet. 2006.*

Hewlett-Packard Development Company. HP USB 2.0 Docking Station. Data Sheet. Jan. 2009.* http://www.intel.com/update/departments/desktop/dt06021.pdf

Dettwiler, Steven, "ADD Cards Provide Affordable DVI and TV-out Support for the Intel® 845G/GL Chipset" Intel Corporation 2002.

* cited by examiner

SYSTEM AND METHOD FOR DVI NATIVE AND DOCKING SUPPORT

BACKGROUND OF THE INVENTION

1. Field of the Invention

The present invention relates in general to the field of information display, and more particularly to a system and method for information handling system native and docking support of Digital Video Interface display signals.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the technology available for information handling system hardware and software components advances, the amount and types of information presented to users have increased in number and complexity, resulting in increased demand for high resolution displays. One difficulty with the presentation of information from an information handling system to a high resolution display is that higher resolutions tend to transfer larger quantities of display information at more rapid rates that have outgrown the capacity of the analog VGA standard. In order to meet consumer display quality demands, information handling system manufacturers have begun to implement the Digital Video Interface (DVI) standard. Typically, DVI is generated on a graphics memory controller hub (GMCH) or graphics processor unit (GPU) as a Digital Video Output (DVO) to a Transition Minimized Differential Signaling (TMDS) transmitter that outputs a serial signal for transmission to a display. TMDS signals are communicated at a relatively high speed of 1.65 GB/s, making signal integrity an important consideration in the communication of a TMDS signal from an information handling system to a display.

One difficulty that arises with implementation of DVI in portable or notebook information handling systems is whether to provide a DVI connector on the system itself or on a docking station. Typically, users of portable information handling systems interface external displays through a docking station that connects to the information handling system through a single connector. However, in some circumstances users of portable information handling systems desire a DVI connector on the information handling system itself, such as to connect with a projector during a presentation. Generally, daisy chain routing of a TMDS signal from a transmitter to a DVI connector on an information handling system and then to a docking station DVI connector results in excessive signal integrity degradation so that supporting separate DVI connectors on an information handling system and docking station tends to require separate TMDS transmitters for each DVI connector and a more complex software solution to provide the same display surface data to be displayed from a TMDS port for docked and undocked configurations. However, the use of separate transmitters is costly in the space consumed on a portable information handling system, in the expense of an additional TMDS transmitter and in the power consumed.

SUMMARY OF THE INVENTION

Therefore a need has arisen for a system and method which supports native and docking station DVI connectors with reduced expense and complexity.

In accordance with the present invention, a method and system are provided which substantially reduce the disadvantages and problems associated with previous methods and systems for communicating display information to native and docking station connectors. Display information automatically communicates with a selected of a first or second TMDS transmitter based on the coupling or decoupling an information handling system and docking station to support a native DVI connector at the information handling system housing or a docking station DVI connector to the docking station.

More specifically, a DVI management system application specific integrated circuit has a multiplexer interfaced with a first native TMDS transmitter and a second docking TMDS transmitter. The multiplexer receives display information generated by information handling system processing components and output by a graphics component, such as a GMCH or GPU, as a DVO signal. The multiplexer provides the display information to the first native TMDS transmitter for output to a native DVI connector if the information handling system is not coupled to the docking station. The multiplexer provides the display information to the second docking TMDS transmitter for output through a docking connector to a docking station DVI connector if the information handling system is coupled to the docking station. The multiplexer automatically switches between the first and second TMDS transmitters by using the docking and undocking selector signal as the multiplexer output selector.

The present invention provides a number of important technical advantages. One example of an important technical advantage is that native and docking station DVI connectors are supported with the same DVO signal so that display software of the information handling system is unaffected for display of the same display surface information from TMDS-based ports for docked and undocked configurations. Minimal impact is made on space and power consumption, with the docking station TMDS transmitter providing display information to the docking station with good signal integrity through minimal additional pins of the docking connector that provide a channel for the display information. Automated switching between TMDS transmitters is provided with existing docking and undocking selection signals applied to the DVI management system to switch the multiplexer output.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Native and docking DVI connector support for a portable information handling system and associated docking station is provided by automated selection of a first or second TMDS transmitter based upon whether the information handling system couples to the docking station. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
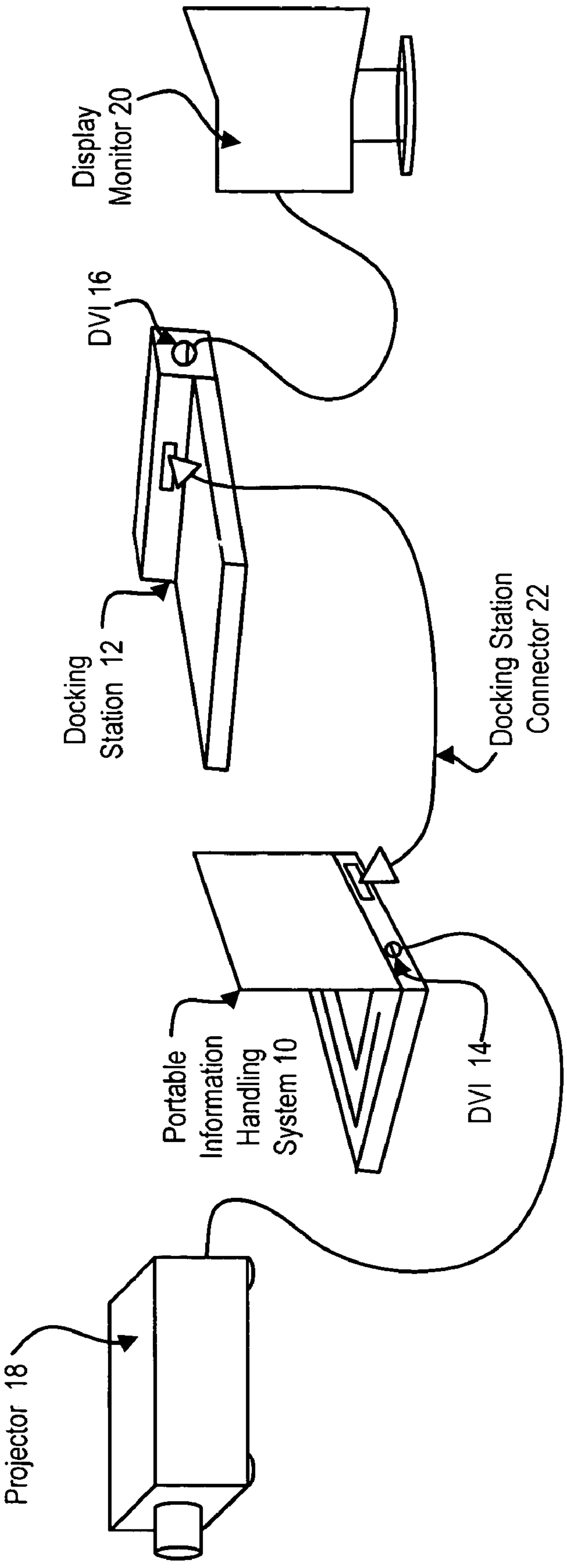
FIG. 1 depicts a portable information handling system and docking station configured to support native and docking station connectors.

Referring now to FIG. 1, a portable information handling system 10 and docking station 12 are depicted as configured to support a native DVI connector 14 or a docking station DVI connector 16 from a common DVO signal. The native DVI connector 14 provides display information accessible to display devices, such as a projector 18, when portable information handling system 10 is not coupled to docking station 12. Docking station DVI connector 16 provides display information accessible to display devices, such as display monitor 20 when portable information handling system 10 is coupled to docking station 12. The display information provided from docking station DVI connector 16 is communicated from a docking station connector 22 associated with portable information handling system 10 to a docking station connector 24 associated with docking station 12 and then out DVI connector 16. Coupling of docking station connectors 22 and 24 provides a signal to portable information handling system 10 to switch display information output from DVI connector 14 to DVI connector 16. Decoupling of docking station connectors 22 and 24 provides a signal to portable information handling system 10 to switch display information output from DVI connector 16 to DVI connector 14.

Figure 2:
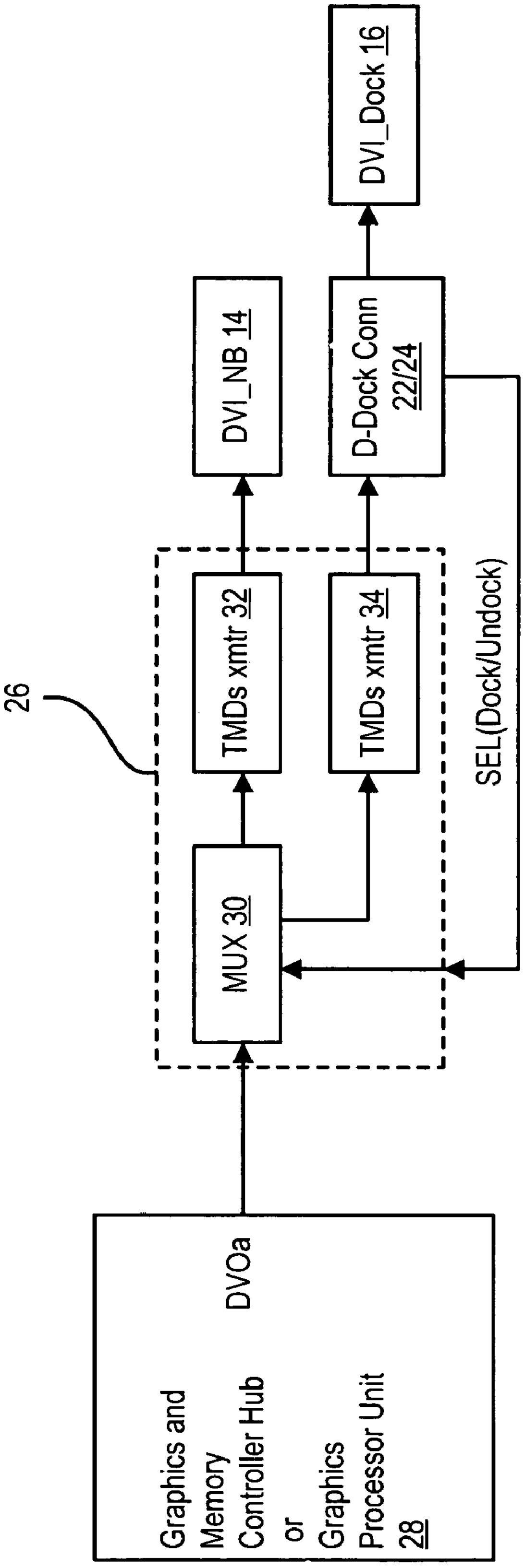
FIG. 2 depicts a block diagram of a system that manages native and docking station DVI connector support.

Referring now to FIG. 2, a block diagram depicts one embodiment of a DVI management system 26 that manages selection of display information output between native and docking station DVI connectors. In the depicted embodiment, DVI management system 26 is integrated into a single part as an application specific integrated circuit (ASIC). Display information is generated by processing components of an information handling system, such as an application running on a CPU, and output as a DVO signal from a graphics component 28, such as a graphics and memory controller hub (GMCH) or a graphics processor unit (GPU). The DVO signal is communicated to a multiplexer 30 of DVI management system 26. Multiplexer 30 selectively communicates the DVO signal to a first native TMDS transmitter 32 or a second docking TMDS transmitter 34 based on a dock/undock selector signal 36 received from detection of a coupling or decoupling of docking connectors 22 and 24. Thus, a single DVO signal supports both native and docking station DVI connectors with minimal impact on the generation of the display information at the information handling system.

In operation, with the dock/undock selector signal indicating no coupling of the information handling system and the docking station, the DVO signal passes through multiplexer 30 into first native TMDS transmitter 32 and out to native DVI connector 14 at the housing of the information handling system. Thus, a user may connect display devices, such as a projector or monitor, directly to the information handling system to present the display information of the DVO signal. If the information handling system is inserted into a docking station, the docking station connector sends selector signal 36 to multiplexer 30 to switch the output sent from multiplexer 30 to second docking TMDS transmitter 34 instead of to first native TMDS transmitter 32. Second docking TMDS transmitter 34 provides the display information through pins of docking connectors 22 and 24 in order to maintain signal integrity and then outputs the display information to docking station DVI connector 16, such as for use with an external display monitor interfaced with the docking station. Since the docking station selector switches multiplexer 30 between the first and second TMDS transmitters, the same DVO signal supports native and docking station DVI connectors to have minimal if any effect on operation of the information handling system or graphics component 28.

Figure 3:
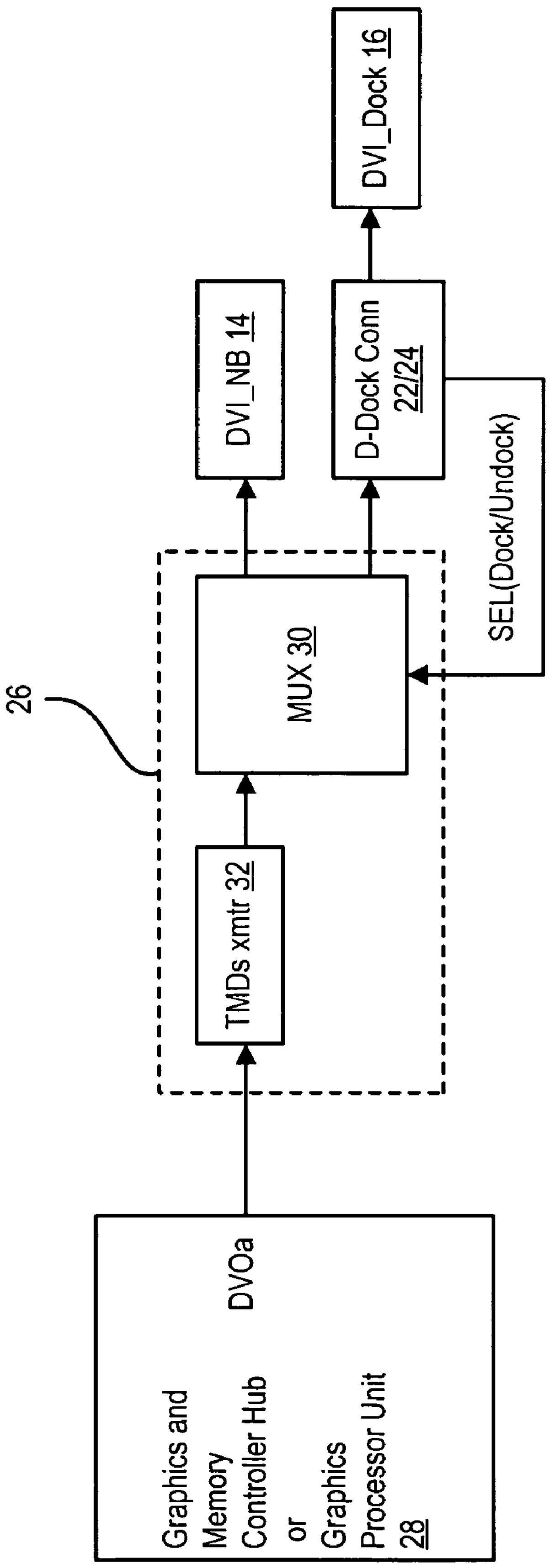

In alternative embodiments, separate TMDS outputs from DVI management system 26 to DVI connectors 14 and 16 are supported with various arrangements of TMDS transmitters and multiplexer 30. For instance, referring to FIG. 3, graphics component 28 outputs the DVO signal directly to a TMDS transmitter 32 of DVI management system 26. The output from TMDS transmitter 32 is to multiplexer 30 is then selectively switched between connector 14 of the information handling system housing and connector 16 of the docking module based upon the coupling or uncoupling of the information handling system and docking module. In other alternative embodiments, the DVI management system 26 of FIG. 2 or FIG. 3 may be incorporated within graphics component 28 as a single component instead of the separated components depicted.

Although the present invention has been described in detail, it should be understood that various changes, substitutions and alterations can be made hereto without departing from the spirit and scope of the invention as defined by the appended claims.

What is claimed is:

1. An information handling system comprising:

a housing;

processing components disposed in the housing and operable to generate display information;

a graphics component interfaced with the processing components and operable to output the display information as a DVO signal;

a selector interfaced with the graphics component to receive the DVO signal and having first and second selectable outputs;

a first TMDS transmitter interfaced with the first selectable multiplexer output and operable to transmit the DVO signal as a DVI output;

a first DVI connector interfaced with the first TMDS transmitter and operable to provide the DVI output at the housing to an external display;

a second TMDS transmitter interfaced with the second selectable selector output and operable to transmit the DVO signal as a DVI output; and a docking connector interfaced with the second TMDS transmitter and operable to provide the DVI output at the housing to a docking station.

2. The information handling system of claim 1 further comprising:

a docking station operable to couple to the housing and to accept the docking connector; and a second DVI connector interfaced with the docking connector and operable to provide the DVI output at the docking station to an external display.

3. The information handling system of claim 2 further comprising:

a docking station detector operable to determine insertion of the information handling system into the docking station; and a switch interfaced with the docking station detector and the selector and operable to select the first TMDS transmitter if the housing is not coupled to the docking station and to select the second TMDS transmitter if the housing is coupled to the docking station.

4. The information handling system of claim 3 wherein the selector and the first and second TMDS transmitters are fabricated as an application specific integrated circuit.

5. The information handling system of claim 3 wherein the graphics component comprises a graphics and memory controller hub.

6. The information handling system of claim 3 wherein the graphics component comprises a graphics processor unit.

7. The information handling system of claim 3 further comprising a projector operable to interface with the first DVI connector to present the display information when the housing is not coupled into the docking station.

8. The information handling system of claim 3 further comprising a display monitor operable to interface with the second DVI connector to present the display information when the housing is coupled into the docking station.

9. A method for presentation of display information from an information handling system, the method comprising:

generating the display information as a DVO signal from a graphics component;

selectively providing the DVO signal to one of a first or a second TMDS transmitter;

transmitting display information from the first TMDS transmitter to a DVI connector coupled to a housing; and transmitting display information from the second TMDS transmitter to a DVI connector coupled to a docking station.

10. The method of claim 9 further comprising interfacing the housing DVI connector to a projector.

11. The method of claim 9 further comprising interfacing the docking station DVI connector to a display monitor.

12. The method of claim 9 wherein selectively providing the DVO signal further comprises:

determining if the housing is coupled to the docking station;

selecting the first TMDS transmitter if the housing is not coupled to the docking station; and selecting the second TMDS transmitter if the housing is coupled to the docking station.

13. The method of claim 12 wherein determining if the housing is coupled to the docking station further comprises activating a switch by the insertion or removal of the housing into the docking station.

14. The method of claim 13 wherein selectively providing the DVO signal further comprises:

communicating the DVO signal to a selector; and switching the output of the DVO signal from the selector to the first or second TMDS transmitter based on activation of the switch by insertion or removal of the housing into the docking station.

15. The method of claim 14 wherein the graphics component comprises a graphics processor unit.

16. The method of claim 14 wherein the graphics component comprises a graphics and memory controller hub.

17. A system for managing output of a DVI signal, the system comprising:

a selector operable to accept a DVO signal having display information;

a first TMDS transmitter interfaced with the selector and operable to output the display information to a DVI connector at an information handling system housing;

a second TMDS transmitter interfaced with the selector and operable to output the display information through a docking connector to a DVI connector at a docking station; and a selector output selector operable to provide the DVO signal to the first TMDS selector if the information handling system is not coupled to the docking station and further operable to provide the DVO signal to the second TMDS selector if the information handling system couples to the docking station.

18. The system of claim 17 wherein the selector, the first TMDS transmitter and the second TMDS transmitter are integrated into an application specific integrated circuit.

19. The system of claim 17 further comprising a graphics and memory controller hub interfaced with the selector and operable to output the DVO signal.

20. The system of claim 17 further comprising a graphics processor unit interfaced with the selector and operable to output the DVO signal.

21. A system for managing output of a DVI signal, the system comprising:

a TMDS transmitter operable to accept a DVO signal having display information and to output the display information to a DVI connector at an information handling system housing;

a selector interfaced with the TMDS transmitter and operable to switch the display information output by the TMDS transmitter to a DVI connector associated with an information handling system housing or a DVI connector associated with a docking connector; and a selector output selector operable to select the housing DVI connector if the information handling system is not coupled to the docking station and further operable to select the docking module connector if the information handling system couples to the docking station.

22. The system of claim 21 wherein the TMDS transmitter and the selector are integrated in an application specific integrated circuit.

* * * * *

UNITED STATES PATENT AND TRADEMARK OFFICE

CERTIFICATE OF CORRECTION

PATENT NO. : 7,624,218 B2
APPLICATION NO. : 10/689253
DATED : November 24, 2009
INVENTOR(S) : Randall E. Juenger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1800 days.

Signed and Sealed this

Twenty-sixth Day of October, 2010

David J. Kappos

David J. Kappos
*Director of the United States Patent and Trademark Office*